(12) United States Patent
Mühlberger et al.

(10) Patent No.: US 7,159,243 B1
(45) Date of Patent: Jan. 2, 2007

(54) DATA CARRIER FOR THE STORAGE OF DATA AND CIRCUIT ARRANGEMENT FOR SUCH A DATA CARRIER

(75) Inventors: Andreas Mühlberger, Graz (AT); Stefan Posch, Gratkorn (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 852 days.

(21) Appl. No.: 09/621,528

(22) Filed: Jul. 21, 2000

(30) Foreign Application Priority Data

Jul. 22, 1999 (EP) .................................. 99890248

(51) Int. Cl.
*G06F 12/14* (2006.01)
*G06F 13/00* (2006.01)
*H04K 1/00* (2006.01)

(52) U.S. Cl. ........................ 726/21; 726/20; 380/28; 711/154

(58) Field of Classification Search ................ 713/193, 713/194, 189, 200, 202; 380/28; 902/25–29; 705/50, 64, 76
See application file for complete search history.

(56) References Cited

U.S. PATENT DOCUMENTS

| 5,097,504 | A | * | 3/1992 | Camion et al. ............ 713/176 |
| 5,237,609 | A | * | 8/1993 | Kimura ...................... 713/193 |
| 5,629,508 | A | * | 5/1997 | Findley et al. .............. 235/382 |
| 5,675,645 | A | * | 10/1997 | Schwartz et al. ........... 713/187 |
| 5,774,546 | A | * | 6/1998 | Handelman et al. ........ 380/227 |
| 5,875,450 | A | * | 2/1999 | Reiner et al. ................ 711/104 |
| H1794 | H | * | 4/1999 | Claus ......................... 235/380 |
| 6,094,724 | A | * | 7/2000 | Benhammou et al. ...... 713/202 |
| 6,112,985 | A | * | 9/2000 | Weinlaender .............. 235/380 |
| 6,298,441 | B1 | * | 10/2001 | Handelman et al. ........ 713/185 |

FOREIGN PATENT DOCUMENTS

WO      WO9729454      8/1997

OTHER PUBLICATIONS

"New smart object based on MIFARE PRO with bank-proven security", Nov. 16, 1999, Business News From Phillips Semiconductors Press Release, p. 1-2.*
Phillips Semiconductors introduces the first family of powerful high-security dual interface controller ICs for multi-service cards Oct. 4, 1999, Business News From Phillips Semiconductors Press Release, p. 1-2.*

* cited by examiner

*Primary Examiner*—Christopher Revak
(74) *Attorney, Agent, or Firm*—Adam L. Stroud

(57) ABSTRACT

A data carrier (1) intended for the storage of data in memory means (17) has a first memory access means (18) for accessing a first storage location (22) and has a second memory access means (33) for accessing a second storage location (23), the first storage location (22) being only accessible by the first memory access means (18) with the aid of access enabling means (21, 19, 37, 39), and further has an additional memory access means (38), so as to enable an access authorization for the access to the first storage location (22) and so as to enable access to the first storage location (22) during an access by the second memory access means (33).

15 Claims, 2 Drawing Sheets

DATA CARRIER FOR THE STORAGE OF DATA AND CIRCUIT ARRANGEMENT FOR SUCH A DATA CARRIER

The invention relates to a data carrier as defined in the opening part of Claim 1.

The invention further relates to an electrical circuit arrangement as defined in the opening part of Claim 1.

The invention further relates to a method as defined in the opening part of Claim 13.

Such a data carrier, such a circuit arrangement and such a method are known from the document WO 97/29454. The known data carrier takes the form of a so-called smart card.

The known data carrier has a contactless first interface for the contactless communication with a communication device. During contactless communication a transmission of energy to the data carrier for the purpose of generating a supply voltage for the circuit arrangement of the data carrier as well as an exchange of data between the data carrier and the communication device are realized by means of an inductive coupling between a transmission coil of the communication device and a transmission coil of the contactless interface with the aid of a high-frequency carrier signal.

The known data carrier further has a contact-bound second interface for the contact-bound communication with a communication device. The contact-bound interface is constructed in accordance with the ISO 7816 standard, thus enabling a supply voltage for the circuit arrangement to be applied and data to be exchanged via the contacts of this interface.

The known data carrier has memory means for the storage of data in a plurality of storage locations, the memory means taking the form of a solid-state memory of the EEPROM type.

A first memory access means can access a first storage location, the first memory access means being formed by a first operating system which has become known under the trademark "Mifare". This first operating system supports a first communication protocol, which guarantees an authenticated access by the first operating system in accordance with the ISO/IEC DIS 9798-2 standard during communication via the contactless interface and during access to the first storage location. An essential feature of this authentication is the secrecy of keys stored in the first storage location.

The second storage location can be accessed by a second operating system, namely a user operating system, via a second memory access means, the second memory access means being formed by parts of the first operating system. The second operating system can support an arbitrary second communication protocol.

The known data carrier further includes access enabling means which ensure that during communication via the contactless interface the first storage location can be accessed only by the first operating system and that during communication via the contact-bound interface the second storage location can be accessed only by the second operating system. The access enabling means are realized by an access enabling stage during cooperation with the respective memory access means by which access is effected. The access enabling stage is stored unalterably in a ROM and enables or inhibits the access to the various storage locations by the memory access means via access authorizations stored in it.

Thus, in the know data carrier the first communication protocol provides a variable first protection and the access enabling means provide an unalterable second protection, i.e. together they provide double protection against unauthorized access to the data in the first storage location.

In practice, the known data carrier is often used at two different system operators. The first system operator may be, for example, a transport company which in the case of communication via the contactless interface should access data stored in the first storage location and representing, for example, transportation units, by means of the first operating system. The second system operator may be a banking company which in the case of communication via the contactless interface should access data stored in the second storage location and representing, for example, amounts of money, with the aid of the second operating system, which is generally implemented independently of the first operating system because of complex requirements imposed by the banking enterprise. It is therefore evident that in the case of such a configuration both system operators require a maximal protection of the data stored in the respective storage locations against unauthorized access by the operating system of the other system operator both from their own point of view and from their customers' point of view and that the access allocation means fully meet this requirement.

However, in the case of cooperation of the system operator it may be desirable that the banking company mentioned in the above example should access the data of the transport company as stored in the first storage location on the data carrier (for example data about transportation units) for the direct settlement of services of the transport company. In actual practice this may mean that in a communication device (bank terminal) of the banking company it should be possible to enter data representative of transportation units in the storage location of the transport company, i.e. in the first storage location.

With the known data carrier there would be a first possibility of allowing cooperation between the system operators in that during a communication via the contact-bound interface the second operating system is given the right, by means of an extension of the first communication protocol, to access the first storage location via the first operating system in accordance with the first communication protocol if the keys necessary for the authorization are known.

However, this possibility is not used. This is because it would require knowledge of the keys stored in the first storage location, i.e. in the storage location of the transport company, by the communication device used by the banking company for the communication with the data carrier. Thus, it would allow authentication but at the same time it would violate the essential feature of the authentication, namely the secrecy of the keys. This would undermine the first protection in a highly undesirable way.

With the known data carrier there would also be a second possibility of cooperation between the system operators, in which case the authentication by means of the keys in accordance with the first communication protocol is omitted. However, the first protection demanded by the transport company, to preclude unauthorized access to the data in the first storage location, would then be eliminated completely.

It is an object of the invention to preclude the problems associated with a data carrier of the type defined in the opening part of Claim 1, with an electrical circuit arrangement of the type defined in the opening part of Claim 7, and with a method of the type defined in the opening part of Claim 13 and to provide an improved data carrier, an improved circuit arrangement and an improved method so as to enable a cooperation of two system operators with an unchanged high degree of protection against unauthorized access to the data stored in the first storage location.

According to the invention, in order to achieve said object with a data carrier of the type defined in the opening part of Claim 1, the characteristic features defined in the characterizing part of Claim 1 have been provided.

According to the invention, in order to achieve said object with a circuit arrangement of the type defined in the opening part of Claim 7, the characteristic features defined in the characterizing part of Claim 7 have been provided.

According to the invention, in order to achieve said object with a method of the type defined in the opening part of Claim 13, the characteristic features defined in the characterizing part of Claim 13 have been provided.

By providing the characteristic features in accordance with the invention as defined in Claims 1, 7 and 13 it is achieved in a highly advantageous manner that after verification of an access authorization and receipt of a positive result of the verification of the access authorization the second memory access means can access the first storage location via additional memory access means not included in the second memory access means and via the first memory access means.

The provision of the additional memory access means in the data carrier and in the circuit arrangement has the advantage that a cooperation of two system operators can be made possible in a simple manner while a high degree of security with regard to unauthorized access to storage locations of the two system operators remains guaranteed for both system operators.

A second advantage is obtained in that the inhibition of a direct access to the first storage location by the second memory access means achieved by means of the access enabling means is maintained and at the same time an access to the first storage location by the second memory access means via the first memory access means is possible after a verification of access authorizations for the protection against unauthorized access to the first storage location.

A third advantage is obtained in that a fully consistent access is assured as a result of the access of the second memory access means to the data in the first storage location with the aid of the first memory access means. This ensures an accessibility of said data during a communication based on a communication protocol of the first memory access means.

A fourth advantage is that an individual configuration of the access authorizations as well as a flexible management of these access authorizations are guaranteed during the life of a data carrier in accordance with the invention, because a system operator, for example a transport company, can assign, refuse and modify access authorizations without any problems during a communication between the data carrier and the contactless communication device.

The provision of the characteristic features of the invention as defined in Claims 2 and 8 yields the advantage that it is possible to use software routines which are already available in the first memory access means, enabling the characteristic features in accordance with the invention to be realized in a particularly simple manner.

The provision of the characteristic features of the invention as defined in Claims 3, 9 and 14 yields the following advantages. First of all, the advantage is obtained that during a verification of an access code with the aid of the access code verification means an access code is used which can be computed from the data of the first storage location. This has proved to be particularly advantageous in view of secrecy of the keys stored in the first storage location, because it is not a key itself that used for the verification but an access code which can be calculated from said key. Secondly, the use of an access code which can be applied by the second memory access means during the verification of the access authorization is highly advantageous because this provides a maximal flexibility as regards the source of this access code capable of being applied. Thus, an applicable access code may be stored in the data of the second storage location or may be calculated from said data. In this respect it has proved to be particularly advantageous when an applicable access code is communicated in an encrypted manner during communication between the data carrier and a communication device via one of the two interfaces.

In a data carrier in accordance with the invention and a circuit arrangement in accordance with the invention the provision of the characteristic features of the invention as defined in Claim 4 and Claim 10 has proved to be highly advantageous in two respects. First of all, the execution of the calculation is speeded up by the provision of dedicated access code calculation means for the calculation of a calculable access code, as a result of which a considerably shorter duration of the communication between the data carrier and a communication device is possible. Secondly, the execution of a triple DES encryption process in accordance with the ISO/IEC 10116 standard prevents a key on which the calculable access code is based can be calculated from an access code derived from this key by the use of an inverse encryption process.

In addition, the provision of the characteristic features of the invention as defined in Claims 5, 11 and 15 has proved to be highly advantageous. This is because it is thus achieved that for the protection against unauthorized access to the first storage location, in addition to the verification of the access code during the verification of access authorizations, a check on access conditions (writing, reading) is performed. This ensures in a simple manner that even in the case of correspondence of an applicable access code to a calculable access code an additional check is carried out before finally a positive result of the verification of the access authorization is obtained upon an additional correspondence of said access conditions. As a result of this measure, a hierarchical structure of the allocation of the access authorization can be provided, thus enabling a maximal protection against unauthorized access to the first storage location to be achieved in a simple manner.

For a data carrier in accordance with the invention and a circuit arrangement in accordance with the invention the provision of the characteristic features of the invention as defined in Claims 6 and 12 has proved to be advantageous because this guarantees a production at minimal costs in the case of production in correspondingly high quantities.

The above-mentioned as well as further aspects of the invention will become apparent from the example of an embodiment described hereinafter and will be elucidated with reference to this example.

The invention will now be described in more detail with reference to the drawings, which shows an embodiment given by way of example but to which the invention is not limited.

Figure 1:
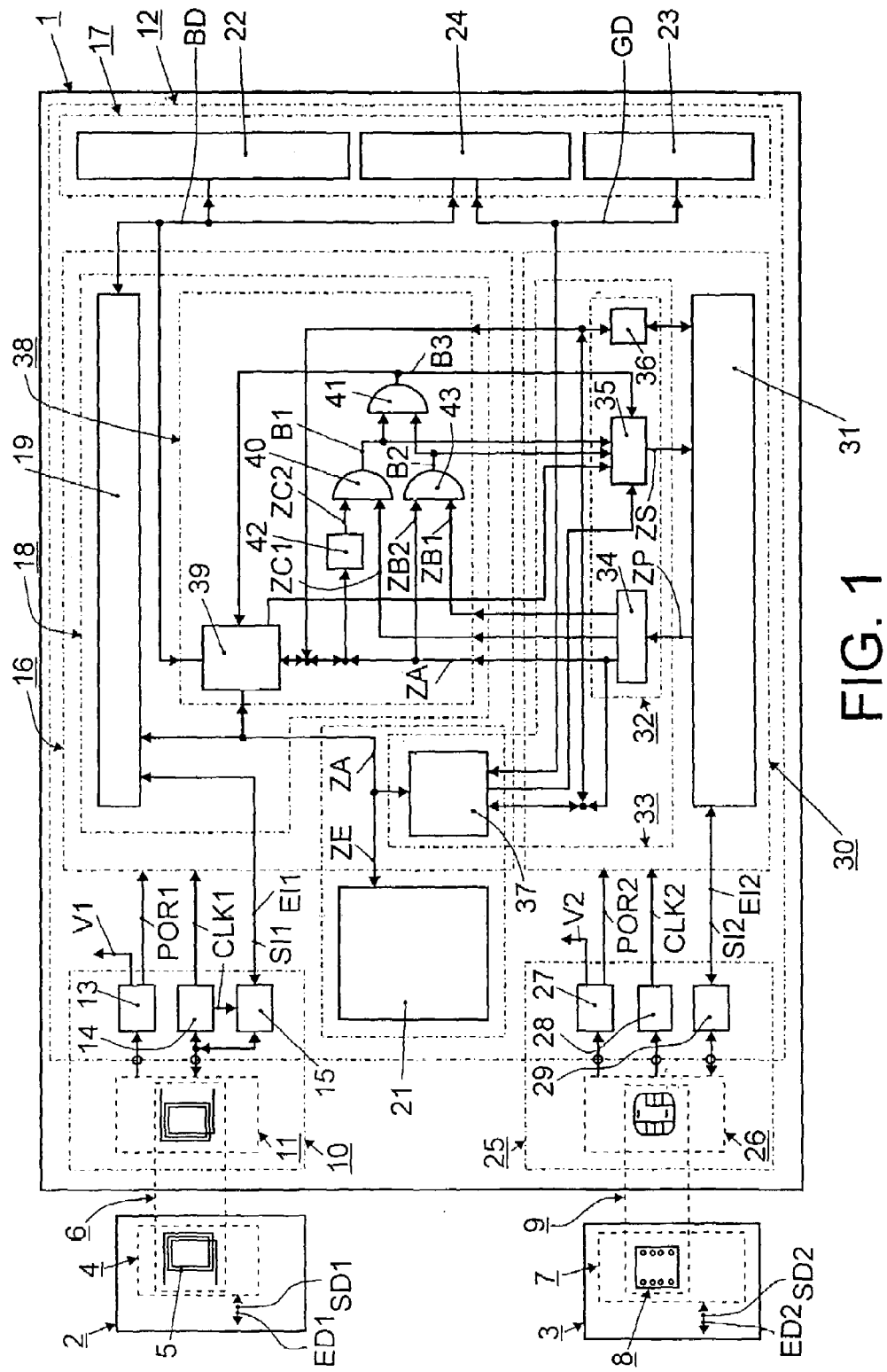
FIG. 1 is a block diagram which diagrammatically shows a data carrier having additional memory-access means.

FIG. 1 is a block diagram which shows a data carrier 1 for the storage of data, which takes the form of a smart card and which is adapted to communicate with a first communication device 2 and a second communication device 3. Such a smart card is formed by a plastic card which accommodates a semiconductor chip forming an electrical circuit arrangement and is known since long.

The first communication device 2 is adapted to provide contactless communication with the data carrier 1 and includes a first transmit/receive means 4. The first transmitting/receiving means 4 is adapted to modulate the amplitude of a carrier signal in accordance with first transmission data SD 1, which can be applied to the first transmitting/receiving means 4 by a first communication means, not shown in FIG. 1. The amplitude-modulated carrier signal is applied to a transmitting/receiving antenna array 5 and is radiated by this array. Conversely, differences in the load of the radiated amplitude-modulated carrier signal can be detected as a load modulation by the first transmitting/receiving means 4 and can be applied to the first communication means as first receiving data ED1 after demodulation. In the present case the transmitting/receiving antenna array 5 takes the form of a primary coil of a communication coil pair 6 required for the contactless communication.

The second communication device 3 is adapted to provide contact-bound communication with the data carrier 1 and includes a second transmitting/receiving means 7. The second transmitting/receiving means 7 includes contact means 8 of a contact pair 9 required for the contact-bound communication, which contact means 8 consist of pin-type contacts. The contact means 8 comply with the ISO 7816 standard. During contact-bound communication the second transmitting/receiving means 7 can apply second receiving data ED2 to a second communication means, not shown in FIG. 1, and the second communication means can apply second transmitting data SD2 to the second transmitting/receiving means 7. The second transmitting/receiving means 7 further has first level adjustment means, which serve for adjusting signal levels of the second transmitting/receiving data SD2 and the second receiving data ED2.

The data carrier 2 has a contactless first interface 10 for the communication with the first communication device 2. The first interface 10 includes a secondary coil 11 of the communication coil pair 6, which is connected to circuit parts of the first interface, namely to a first supply voltage means 13 included in an electrical circuit arrangement 12 of the data carrier 1 and to a first signal conversion means 15 included in the electrical circuit arrangement 12.

When a carrier signal is received by means of the secondary coil 11 the first supply voltage means 13 generates a first supply voltage V1 from the received carrier signal, which first supply voltage serves to provide the electrical power supply of the electrical circuit 12 during contactless communication. When a nominal value of the first supply voltage V1 appears the first supply voltage means 13 supply a first starting signal POR1 to a first operating system 16.

Upon reception of the carrier signal the first clock generator 14 generates a first system clock signal CLK1. The first system clock signal CLK1 is applied to the first signal conversion means 15 for the purpose of synchronizing the communication between the first communication device 2 and the first interface 10. Moreover, the first system clock signal CLK1 is applied to the first operating system 16 as an operating clock signal for the purpose of synchronizing the processing of first reception information EI1 and first transmission information SI1, which can be exchanged bidirectionally between the signal conversion means 15 and the first operating system 16.

When the data carrier 1 comes in the proximity of the first communication device 2 and a carrier signal is transmitted via the communication coil pair 6, the data carrier 1 is located within a communication range of the first communication device 2. When the data carrier 1 is within the communication range the first supply voltage V1 for the electrical circuit arrangement 12 is built up upon reception of the carrier signal, which has a frequency of 13.56 MHz in the present example, after which the system clock signal CLK1 is generated and subsequently the processing by the first operating system 16 is started by means of the starting signal POR1. Subsequently, the first operating system 16 effects a selection in accordance with a first communication protocol to select a single data carrier 1 from a plurality of data carriers 1 which may be present within the communication range, after which communication can be established with a selected data carrier 1. Such a selection in conjunction with contactless communication is common practice.

During contactless communication the received carrier signal is applied to a demodulator included in the first signal conversion means 15, which demodulator is adapted to demodulate the amplitude-modulated carrier signal and to supply first reception information EI1 to the first operating system 16. During contactless communication the first operating system 16 applies first transmission information SI1 to a modulator included in the first signal conversion means 15, the modulator being adapted to effect a load modulation of the carrier signal in accordance with the first transmission information SI1.

The data carrier 1 further includes memory means 17 for the storage of data. Such data may represent, for example, amounts of money, transportation units or personal data of a user.

The first operating system 16 is formed by a microprocessor and a first program that can be executed by the microprocessor, as is generally known. The first operating system 16 thus forms a first memory access means 18, arranged between the first interface 10 and the memory means 17, for accessing the memory means 17.

The first memory access means 18 enable access to data stored in the memory means 17 of the electrical circuit arrangement 12. During access to data stored in the memory means 17 it is possible to write data and to read data. Apart from the access, it is possible to carry out said first communication protocol and arithmetic operations with the aid of a first data processing means 19 included in the first memory access means 18. In accordance with the first communication protocol an authentication during the access to the first storage location 22 has been provided, the arithmetic operations being used for the authentication, as will be described hereinafter.

The data carrier further comprises access enabling means. During access to the memory means 17 by the first memory access means 18 the access enabling means are formed by an access enabling stage 21 together with the first data processing means 19. The access enabling stage 21, which is formed by a ROM, unchangeably stores access authorizations ZE corresponding to all the addressable access addresses ZA of the memory means 17. For example, a logic one as the access authorization ZE(n) corresponding to the access address ZA(n) indicates that access to the access address ZA(n) by the first memory access means 18 is allowed, while a logic zero as the access authorization ZE(m) corresponding to the access address ZA(m) indicates that access to the access address ZA(m) by the first memory access means 18 is not allowed.

A first division of the memory means 17 in the data carrier 1 into a first storage location 22, a second storage location 23 and a third storage location 24 is realized by means of the access enabling means, the access authorizations stored in the access enabling stage 21 only enabling the first storage location 22 to be accessed by the first memory access means 18. The access authorizations ZE also enable the third storage location 24 to be accessed by the first memory access means 18, which storage location can also be accessed by a second memory access means, but this will not be considered any further here.

The data carrier 1 further has a second division of the first storage location 22 into sectors. Each sector is made up of four blocks, each block comprising sixteen bytes. Each sector has a sector trailer formed by the fourth block. The sector trailer stores a first key and a second key. The keys serve as a basis for the authentication during access to the first storage location 22.

During the authentication in accordance with the first communication protocol the first communication device 2 generates a first random number, which is preserved in the first communication device 2 during the authentication, and the first data processing means 19 generates a second random number, which is preserved in the first data processing means 19 during the authentication. These two random numbers are transmitted between the data carrier 1 and the first communication device 2 and, on the one hand, the second random number is encrypted with a third key in the first communication device 2 and, on the other hand, the first random number is encrypted by the first data processing means 19 with the first key of the sector addressed with the access address ZA. The two encrypted random numbers are communicated between the data carrier 1 and the first communication device 2. In the first communication device 2 the encrypted first random number is decrypted by means of the third key, yielding a first decrypted random number. In the first data processing means 19 the encrypted second random number is decrypted by means of the first key, yielding a second decrypted random number. The authentication for access to the data in the sector addressed by means of the access address ZA is completed successfully if in the first communication device 2 the preserved first random number corresponds to the first decrypted random number and if in the first data processing means 19 the preserved second random number corresponds to the second decrypted random number. This implies that the first key and the third key are identical or, phrased differently, that the first communication device 2 must know the key of the sector addressed with the access address ZA.

In addition to the two keys, the sector trailer stores a sector access condition with the aid of which the access can be controlled for each sector. This is to be understood to mean that the data of a first sector can be accessed only for data writing, while a second sector is accessible only for data reading. Furthermore, a third sector may enable both reading of data and writing of data. Finally, a fourth sector may inhibit both writing and reading of data, which is used for example in the case of data which is employed exclusively during processing of the first operating system 16 and which should consequently be protected against access during communication.

The data carrier 1 further has a contact-bound second interface 25 for the communication with the second communication device 3. The second interface 25 has a contact array 26 of the contact pair 9, whose contact faces can be brought into contact engagement with the contacts of the contact means 8. A first group of connections of the contact array 26 is connected to a circuit part of the second interface 25, i.e. to a second supply voltage means 27 included in the electrical circuit arrangement 12. A second group of connections of the contact array 26 is connected to a further circuit part of the second interface 25, i.e. to a second clock generator 28 included in the electrical circuit arrangement 12. A third group of connections of the contact array 26 is connected to a further circuit part of the second interface 25, i.e. to a second signal conversion means 29 included in the electrical circuit arrangement 12, as provided for in the ISO 7816 standard.

By means of the first group of connections a voltage can be applied to the second supply voltage means 27. The second supply voltage means 27 generates a second supply voltage V2 from said voltage, which second supply voltage serves for electrically powering the electrical circuit arrangement 12 in the case of contact-bound communication. When a nominal value of the second supply voltage V2 occurs the second supply voltage means 27 supply a second starting signal POR2 to a second operating system 30.

The second clock generator 28 can be energized with a clock signal via the second group of connections and, when energized, generates a second system clock signal CLK2. The second system clock signal CLK2 is applied to the second operating system 30 as an operating clock signal for the purpose of synchronizing the processing of second reception information EI2 and second transmission information SI2, which can be exchanged bidirectionally between the second signal conversion means 29 and the second operating system 30.

The second signal conversion means 29 is energized via the third group of connections and effects a level adjustment of the second reception information EI2 and the second transmission information SI2 during communication via the second interface 25.

The second operating system 30 is formed by the microprocessor and a second program which is stored in the ROM and which can be executed by the microprocessor, a second data processing means 31 and an interface means 32 of the second operating system being shown in FIG. 1. With the aid of the second data processing means 31 it is possible to carry out a second communication protocol. The second communication protocol provides for an authentication in the case of access to the second storage location, which authentication during access to the second storage location will not be described in any further detail. The second communication protocol further provides for encrypted contact-bound communication, as a result of which the second reception information EI2 supplied by the second signal conversion means 29 is subsequently decrypted by the second data processing means 31 and is then applied to the interface means 32.

The data carrier 1 further has a second memory access means 33 between the second interface 25 and the memory means 17 to access the memory means 17. The second memory access means 33 includes the interface means 32, which comprises an access request buffer 34, a status reception buffer 35 and an access data buffer 36.

In the case of access to the memory means 17 by the second memory access means 33 access parameters ZP are transmitted from the second operating system 30 to the first operating system 16 with the aid of the access request buffer 34 and are processed by the second memory access means 33. The access parameters ZP to be transmitted are, for example, an access address ZA, a first access code ZC1 and a first access condition ZB1. A first access code ZC1 may be, for example, a password. A first access condition ZB1 may, for example, specify that it has been requested to write data into the memory means 17 or to read data from the memory means 17.

With the aid of the status reception buffer 35 an access status ZS can be transmitted from the first operating system to the second operating system and can thus be transmitted to the second data processing means 31, the access status ZS indicating a successful access to the memory means 17 in a first status or an unsuccessful access in a second status.

When the first status is indicated the data addressed with the access address ZA can be accessed, as will be described in greater detail with reference to a first example of use. When the second status is indicated the access to the memory means 17 by the second operating system 30 should be discontinued.

In accordance with the second communication protocol the access status ZS and, if applicable, also the data to be applied to the second data processing means 31 from the access data buffer 36 is subsequently encrypted by the second data processing means 31 and is supplied to the second signal conversion means 29 as second transmission information S12.

The second memory access means 33 includes an access approval means 37 which, together with the access enabling stage 21, forms access enabling means in the case of access to the memory means 17 by the second operating system 33. With the aid of the access approval means 37 the second memory access means 33 can verify an access authorization ZE on the basis of an access address ZA applied via the access request buffer 34. When an access authorization ZE is received the access approval means 37 access the data, defined by the access address ZA, in the second storage location 23 or the third storage location 24 of the memory means 17. During the access data is exchanged either between the second storage location 23 or the third storage location 24 and the access data buffer 36 via the access approval means 37. Furthermore, the access approval means 37 apply the access status ZS to the second data processing means 31 of the second operating system via the status reception buffer 35.

During access of the second memory access means 33 to the memory means 17, the second memory access means 33 is allowed exclusive access the second storage location 23 and access to the third storage location owing to the interrelated storage of the access addresses ZA and access authorizations ZE in the access enabling stage 21.

The operation of the smart card, i.e. of the data carrier 1 in accordance with the invention, will now be explained hereinafter with reference to a first example of use of the data carrier 1 in the embodiment of the invention shown in FIG. 1. In this first example of use it is assumed that the data carrier 1 is made available by a first system operator, namely by a banking company as an electronic wallet.

Amounts of money in the form of money data GD can be entered or withdrawn at a bank terminal during an access to the second storage location 23 of the data carrier 1 after identification of a user. Entry or deduction of the amounts of money is effected during a contact-bound communication between a bank terminal, which is equipped with the second communication device 3 for contact-bound communication, and the contact-bound second interface 25 of the data carrier 1. In the first example of use it is assumed that the user of the data carrier wishes to transfer one hundred Euro from his account with the banking company into the electronic wallet, for which purpose money data GD corresponding to the one hundred Euro must be stored in the memory means 17. For this purpose, the user inserts the smart card into a slot of the bank terminal, upon which a contact bound communication is started.

In the course of the subsequently started communication between the second interface 25 and the second transmitting/receiving means 7 of the second communication device 3 second transmission data SD2 to be entered and representing one hundred Euro are communicated to the second signal conversion means 25. The second signal conversion means 25 generates second reception information EI2 from the second transmission information SD2, the content of this second reception information, in accordance with the first example of use, relating to the addition of money data GD corresponding to one hundred Euro to the data of the second storage location 23 of the memory means 17. The content now consists of the access parameters ZP, which comprise an access address ZA, i.e. the access address ZA of the electronic wallet, a first access condition ZB1, i.e. a first access condition ZB1 corresponding to an entry, and the money data GD to be entered and corresponding to the one hundred Euro.

The second reception information EI2 is received by the second data processing means 31 and is decrypted. The access parameters ZP are transferred to the access request buffer 34.

In accordance with the access address ZA the first access approval means 37 of the second memory access means 33 determines whether a read and write access authorization ZE for money data GD addressed with the access address ZA is available for the applied access address ZA in the second storage location 23 of the memory means 17. When this access authorization ZE is available the first access approval means 37 subsequently gains access to the old money data GD stored in the second storage location 23 at the access address ZA so as to read the old money data GD. In the first example of use said old money data GD correspond to an amount of twenty Euro. The old money data are transferred from the first access approval means 37 to the second data processing means 31 via the access data buffer 36, which data processing means adds the money data GD to be entered to the old money data GD. This results in new money data GD representing one hundred and twenty schilling, which new money data is transferred from the second data processing means 31 to the first access approval means 37 via the access data buffer 36. The new money data GD is stored as data at the access address ZA in the second storage location 23 by the first access approval means 37 during a write access. This access concludes the entry of money data GD to be entered and corresponding to one hundred Euro and the access status ZS is communicated to the second data processing means 31 by the second memory access means 33 via the status reception buffer 35 and is subsequently communicated to the second communication device 3 in the form of second reception data ED2, upon which the user of the data carrier 1 is informed about the successful transaction and the communication is terminated.

In analogy to the entry of money data GD to be entered, as described in the preceding paragraph, money data GD to be deducted are deducted, for example at a cash desk equipped to provide contact-bound communication with the data carrier 1, in the course of which communication merely the money data GD to be deducted and corresponding to a value of an amount to be paid should be subtracted from the old money data GD and the new money data GD thus obtained should be stored.

The operation of the smart card, i.e. of the data carrier 1 in accordance with the invention, will now be explained hereinafter with reference to a second example of use of the data carrier 1 in the embodiment of the invention shown in FIG. 1. In this second example of use it is assumed that the data carrier 1 is made available by a second system operator, namely a public transport company as an electronic ticket.

At a booking terminal transportation data BD corresponding to transportation units are entered on payment of transportation charges during access to the first storage location 22 of the data carrier 1. Transportation units are entered during a contactless communication between the booking terminal, which is equipped to provide contactless communication with the first communication device 2, and the contactless first interface 10 of the data carrier 1. Transportation units are debited during a contactless communication between an entrance gate terminal to transport means of the transport company, the entrance gate terminal also be equipped to provide contactless communication with the first communication device 2. In the second example of use it is assumed that a user wishes to add five (5) transportation units to the electronic ticket, for which purpose transportation data BD to be added and corresponding to the five (5) transportation units must be stored in the memory means 17.

In order to add transportation units the data carrier 1 is brought within the communication range of the booking terminal. In accordance with the first communication protocol a selection of the data carrier 1 is effected upon the start of the first operating system. Subsequently, during a communication the transportation data BD is entered into the first storage location 22 in a selected data carrier 1.

In the course of a communication between the first interface 10 and the first communication device 2 the first transmission data SD1 corresponding to the five (5) transportation units to be added is communicated to the first signal conversion means 15. The first signal conversion means 15 generates first reception information EI1 from the first transmission data SD1, the contents of this first reception information in the second example of use relating to the addition of the transportation data BD to be added and corresponding to the five (5) transportation units to the data of the first storage location 22 of the memory means 17. Subsequently, the first reception information EI1 is decrypted by the first data processing means 19 in accordance with the first communication protocol.

On the basis of an access address ZA included in the content of the first reception information EI1 the first data processing means 19, which forms access approval means together with the access enabling stage 21, now determines whether there is an access authorization ZE for access to the first storage location 22 at the access address ZA.

When there is an access authorization ZE and when the subsequent authentication is successful the first memory access means 18 can access the transportation data BD stored in the sectors of the first storage location 22.

When there is an access authorization ZE the first data processing means 19 subsequently access the old transportation data BD stored at the access address ZA in the first storage location 22 so as to read the old transportation data BD. In the second example of use said old transportation data BD represent three (3) transportation units. The first data processing means 19 subsequently adds the transportation data BD to be entered and corresponding to the five (5) transportation units to the old transportation data BD. This results in new transportation data BD which corresponds to eight (8) transportation units and which is stored as transportation data at the access address ZA in the first storage location 23 during the write access. This access terminates the entry of transportation data BD to be added and representing five (5) transportation units. The termination of the entry is communicated to the contactless first communication device 2 of the booking terminal in the form of first receiving data ED1, upon which the user of the data carrier 1 is informed about the successful transaction and the communication is terminated.

The deduction of transportation data BD to be deducted is effected in analogy to the entry of transportation data BD to be added as described hereinbefore, the first data processing means 19 merely subtracting the transportation data BD to be deducted from the old transportation data BD in the course of a communication and storing the new transportation data BD thus obtained.

The operation of the smart card, i.e. of the data carrier 1 in accordance with the invention, will now be explained hereinafter with reference to a third example of use of the data carrier 1 in the embodiment of the invention shown in FIG. 1. In this third example of use it is now assumed that the banking company and the transport company cooperate and that it should be possible to enter transportation units into the first storage location 22 at a bank terminal, i.e. booking terminal.

For this purpose, the data carrier 1 has additional memory access means 38 provided in accordance with the invention.

The additional memory access means 38 are adapted to cooperate with the second memory access means 33 and to gain access to the first storage location 22 and to verify an access authorization in such a manner that after a positive result of the verification of the access authorization the second memory access means 33 can also access the first storage location 22 via the additional memory access means 38 and via the first memory access means 18.

This yields the advantage that during a contact-bound communication with a bank terminal via the second interface 25 the second operating system 30 can access the first storage location 22 via the first operating system 16 after the verification of an access authorization and after having received a positive verification result. This guarantees a high level of protection against unauthorized access to the storage locations of the systems during cooperation of the two system operators.

A further advantage is that the provision of a verification of an access authorization enables a flexible structure as well as a flexible management of this access authorization to be achieved. For example, in the case of an incorrect use of the data carrier 1 any further use of the data carrier as an electronic ticket can be inhibited in a very simple manner, in conjunction with the inventive measures, during a contactless communication with an entrance gate terminal of the transport company, although the data carrier 1 can subsequently be used as an electronic wallet without any restriction. Moreover, the advantage is obtained that software routines already used in the first operating system can be utilized, as a result of which the characteristic features of the invention can be realized in a particularly simple manner.

The additional memory access means 38 are included in the first memory access means 18 and have a second access approval means 39 which on account of an applicable access address ZA together with the access enabling stage 21 forms access enabling means adapted to determine an access authorization ZE for the memory means 17.

This yields the advantage that it remains possible to prevent a direct access to the first storage location 22 by the second operating system 30 with the aid of the access enabling means. However, as a result of the presence of an access authorization for an access by additional memory access means 38 included in the first operating system 16, the second operating system 30 can access the first storage location 22 via the additional memory access means 38. Moreover, the prevention of a direct access to the first storage location 22 by the second operating system 30 ensures that the access to the transportation units proceeds in a wholly consistent manner because access is possible only with a part of the first operating system 16, i.e. the additional memory access means 38. This precludes an incorrect access, such as for example an incorrect writing of transportation data into the first storage location 22 by the second operating system 30 of the banking company.

The additional memory access means 38 further include additional code verification means for the verification of an access code. The access verification means 40 is shown symbolically as an AND gate, which can supply a first verification result B1 to a verification result logic means 41, which is also shown symbolically as an AND gate. The first verification result B1 is also made available to the second operating system 30 via the status reception buffer 35. The access code verification means 40 can receive a first access code ZC1 from the second memory access means 33 via the access request buffer 34 and can also receive a second access code ZC2, which can be calculated by means of the first key and the second key, which are stored in the first storage location 22. A positive result of the access authorization verification requires correspondence between the first access code ZC1 and the second access code ZC2.

This yields the advantage that there is maximal flexibility as regards the source of the access code ZC1 that can be applied. Thus, the applicable access code ZC1 can be communicated advantageously during a communication between the data carrier 1 and a contact-bound communication device 3, which is particularly useful when an applicable access code ZC1 should be available for each user. It may also be advantageous to store the applicable access code ZC1 in the second storage location 23 if the user is not required to re-enter the applicable access code ZC1 via the bank terminal upon each entry of transportation units. Furthermore, in the case that extreme requirements are imposed on the secrecy of the applicable access code ZC1, it may also be advantageous to calculate the applicable access code ZC1 from data transmitted during a communication or from data stored in the memory means 17 by means of the second data processing means 31.

The additional memory access means 38 further includes an access code calculation means 41 for the calculation of the calculable second access code ZC2, which access code calculation means is adapted to execute a triple DES encryption process in accordance with the ISO/IEC 10116 standard. In the case that there is an access authorization ZE for an access address ZA the second access approval means 39 access a sector of the first storage location 22 whose address is defined by the access address ZA to read the first key and the second key. The first key and the second key are applied to the access code calculation means 42 with the aid of the second access approval means 39, thus enabling the calculation of the second access code ZC2, which is carried out by the access code calculation means 42. It is to be noted that the triple DES encryption process requires the first key and the second key for the calculation of the second access code ZC2.

This yields the advantage that the keys used as the basis for the authentication in accordance with the first communication protocol during the access to the sectors of the first storage location can subsequently be kept secret and the banking company should merely know the access code ZC1 that can be calculated from the keys.

Moreover, this yields the advantage that the calculation of the second access code ZC2 is speeded up significantly, because the access code calculation means 42 suitably takes the form of a crypto-coprocessor.

A further advantage is obtained in that the use of the triple DES encryption process precludes a reversal of the calculation in order to determine the keys.

In addition to the access code verification means 40 the additional memory access means 38 include access condition verification means 43 for the verification of an access condition. The access condition verification means 43 is shown symbolically as an AND gate, which can supply a second verification result B2 to the verification result logic means 41. The access condition verification means 43 can receive a first access condition ZB1 from the second memory access means 33 via the access request buffer 34 and can also receive a second access condition ZB2, which can be derived from the data in the first storage location 22 as the sector access condition. If there is an access authorization ZE for an access address ZA the second access approval means 39 access data of a sector of the first storage location 22 whose address is defined by means of the access address ZA, said data representing the sector access authorization. The sector access authorization is read by the second access approval means 39 and is applied to the access condition verification means 43 as the second access condition ZB2.

This yields the advantage that for the protection against unauthorized access to the first storage location 22, in addition to the verification of the access code ZC1, a verification of the access condition ZB1 is provided during the verification of access authorizations. Thus, even in the case of correspondence of an applicable access code to a calculable access code, an additional verification may be carried out before finally a positive result of the verification of the access authorization is obtained in the case that these access conditions are also in agreement. This measure enables a hierarchical allocation of the access authorization. For example, during communication of the data carrier 1 with the contactless communication device 2 of an entrance gate terminal of the transport company a problem with the debiting of transportation units may arise which cannot be solved on the spot. This problem may be, for example, a serious deficit on the balance of transportation units stored on the data carrier. During the communication the entrance gate terminal can now alter an access condition for transportation data BD corresponding to the transportation units in such a manner that an addition of transportation units at a bank terminal is no longer possible even when a valid access code is entered. During the communication with the bank terminal it is then possible to display a message for the user, requesting him to go to a booking terminal to solve the current problem. When a problem has occurred during a correct use of the data carrier 1 a re-allocation of the access code ZC1 is therefore not compulsive with the hierarchical allocation of the access authorization. The problem that has arisen can be explained to the user at the booking terminal and, if necessary, the access condition for the transportation data BD corresponding to the transportation units can be altered so as to enable transportation data BD corresponding to transportation units to be entered again at a bank terminal.

A prerequisite for a positive result of the verification of the access authorization is agreement between the first access code ZC1 and the second access code ZC2, as represented by the first verification result B1, as well as agreement between the first access condition ZB1 and the second access condition ZB2, as represented by the second verification result B2. The result of the verification of the access authorization is generated with the aid of the verification result logic means 41, which is shown symbolically as an AND gate, and is transferred as a third verification result B3 to the second access approval means 39 as well as to the status reception buffer 35.

In the second example of use it is assumed that the user of the data carrier 1 withdraws one hundred Euro from his account at a bank terminal and at the same time loads transportation units to the amount of one hundred Euro into the first storage location 22 of the data carrier 1 at the bank terminal, in which storage location 22 old transportation data BD corresponding to transportation units of the transport company is stored. For this purpose, the user inserts the smart card into a slot of the bant terminal, upon which a contact-bound communication via the contact pair 9 begins. The user subsequently identifies himself as the legitimate user for the second operating system of the banking company. With the aid of an entry console he expresses the wish to load transportation units into the memory means 17 of the data carrier 1 and to pay these transportation units directly through his account with the banking company. He is prompted to enter the amount to be spent on transportation units into the bank terminal. Subsequently, he is prompted the enter the first access code ZC1, with which he identifies himself as a legitimate user for the second operating system of the transport company.

In the third example of use, during a subsequently started communication between the second interface 25 and the second transmitting/receiving means 7 of the second communication device 3, it is now also possible that second reception information EI2 occurs, whose content relates to the entry of transportation data BD corresponding to the transportation units to be added into the first storage location 22. The second reception information EI2 is received by the second operating system 30 and is applied from the second data processing means 31 to the interface means 32, where the access parameters ZP are applied to the additional memory access means 38 via the second memory access means 33. Moreover, via the access request buffer 34, the first access code ZC1 is applied to the access code verification means 40 and the first access condition ZB1 is applied to the access condition verification means 43.

Figure 2:
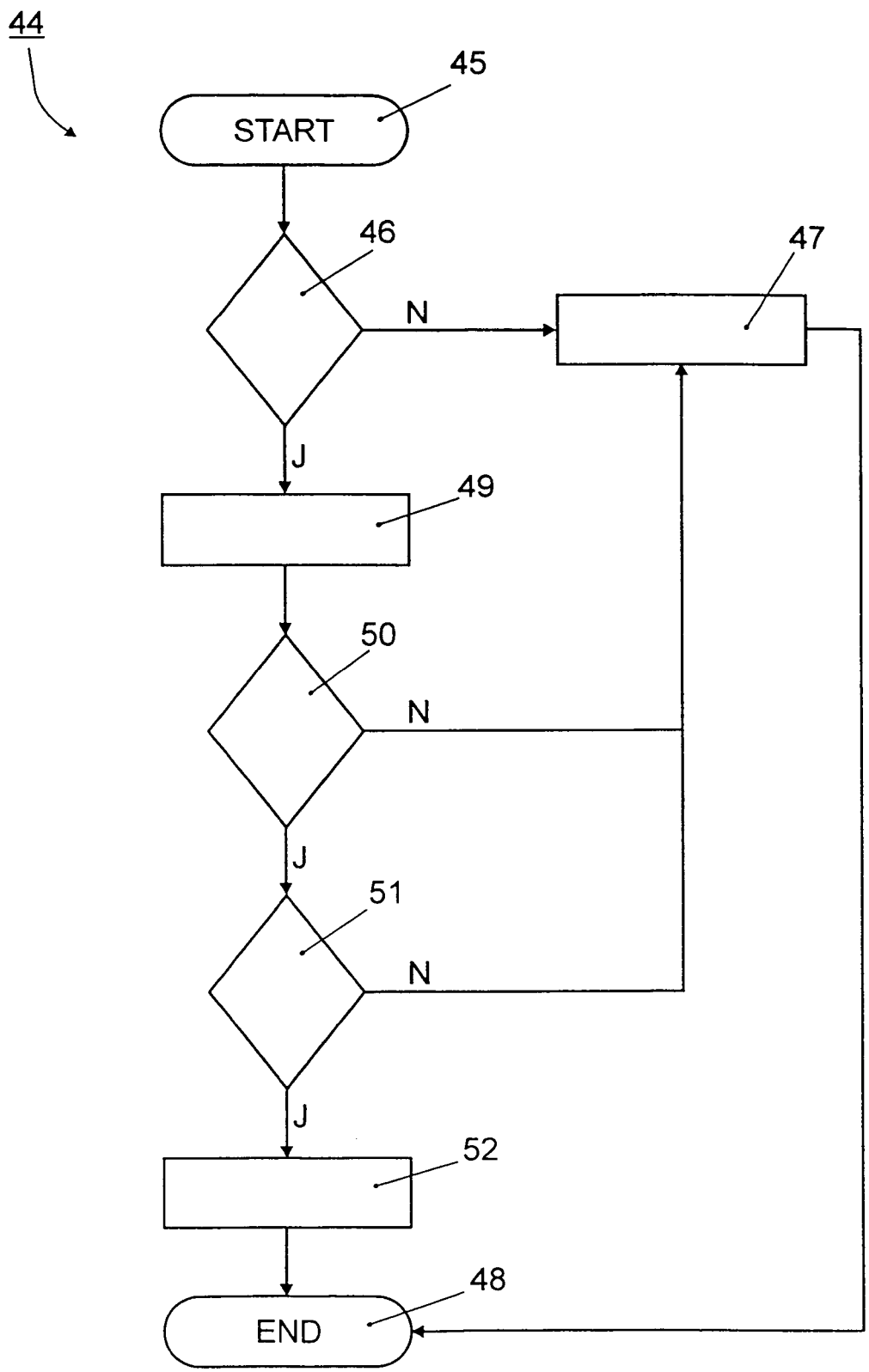
FIG. 2 is a flow chart which shows a method of accessing memory means of the data carrier shown in FIG. 1.

Hereinafter, the access to the first storage location 22 of the memory means 17 of the data carrier 1 by means of a method in accordance with the invention is described, which is represented by the flow chart 44 shown in FIG. 2.

The execution of the method 44 in accordance with the invention starts in a block 45, when the access parameters ZP are applied to the access request buffer 34.

In a following block 46 the access enabling means formed by the second access approval means 39 and the access enabling stage 21 first determine on the basis of the access address ZA whether there is an access authorization ZE for an access address ZA of the first storage location 22.

In the absence of an access authorization ZE the second operating system 30 is informed about the access status ZS, that access is not allowed, via the status reception buffer 35 in a block 47. Subsequently, the second operating system 30 communicates the access status ZS to the second communication device 3 and the memory access means 38 discontinues the access to the first storage location 22, upon which the method 44 in accordance with the invention is terminated in the block 48.

If the case that there is an access authorization ZE the access code calculation means 42 subsequently calculates the calculable second access code ZC2 in a block 49.

Subsequently, in a block 50, the calculable second access code ZC2 is compared with the applicable first access code ZC1 with the aid of the access code verification means 40. On the basis of the first verification result B1 thus obtained it is decided whether the access may be continued or is to be discontinued.

In the case that there is no agreement between the first access code ZC1 and the second access code ZC2 the method 44 proceeds to the block 47 and is terminated in the block 48.

In the case that there is agreement between the first access code ZC1 and the second access code ZC2 the method 44 proceeds to a block 51, in which the first access condition ZB1 and the second access condition ZB2 are compared and a second verification result B2 is obtained. On the basis of the verification result B2 thus obtained it is decided whether the access is continued or whether the access is to be discontinued.

In the case that there is no agreement between the first access condition ZB1 and the second access condition ZB2 the method 44 proceeds to the block 47 and is terminated in the block 48. In the case that there is agreement between the first access condition ZB1 and the second access condition ZB2 the method 44 proceeds to a block 52, in which the storage location 22 is accessed and access is subsequently terminated in the block 48.

During said access to the first storage location 22 the old transportation data BD is read first of all with the aid of the second access approval means 39 and the old transportation data BD is transferred to the second data processing means 31 via the access data buffer BD, in which data processing means the old transportation data BD is added to the transportation data BD to be entered. The new transportation data BD thus obtained is transferred to the second access approval means 39 via the access data buffer 36 and is stored as data by the second access approval means 39 at the access address ZA in the first storage location 22 during a write access. Thus, the transportation units to the amount of one hundred schilling are stored in the first storage location 22 of the transport company as transportation data BD to be entered.

Thus, in the third example of use the second communication device 3 of the second system operator merely needs to know a first access code ZC1, which can be calculated from two keys of a sector of the first storage location 22 by means of a triple DES process and which is identical to the second access code ZC2. In the present case the first access code ZC1 has been made available to the second communication device 3 via the bank terminal during entry of the first access code ZC1. Consequently, it is achieved that by means of the additional memory access means 38 in accordance with the invention access to the first storage location 22 is possible during a communication via the contact-bound second interface 25 of the data carrier 1, although only the first system operator knows the keys of the sectors of the first storage location 22. This guarantees the protection, required by the first system operator, against unauthorized access to data stored in the first storage location 22 during a cooperation between the two system operators. In addition to this protection this has the advantage for the user of the data carrier 1 that he can enter transportation units directly at a bank terminal and thus saves additional time.

It is to be noted that during access to the memory means 17 the means 19, 37, 39, which together with the access enabling stage 21 form access enabling means, can access a common software routine which forms part of the first operating system 16.

It is to be noted that the access enabling means and the additional memory access means 38 provided in accordance with the invention form parts of a master operating system which ranks higher than one or more other operating systems and that access to the memory means 17 is possible only with the aid of these two parts.

It is to be noted that the data carrier 1 in accordance with the invention may form part of a key or a key fob. Moreover, the data carrier 1 in accordance with the invention may form part of a piece of jewelry such as for example a watch or a ring. Moreover, it is to be mentioned that a data carrier 1 in accordance with the invention may be part of a writing instrument such as for example a ballpoint pen.

It is to be noted that a known data carrier 1 may include an interface switching means. The interface switching means serves to switch between the first interface 10 for contactless communication with a contactless communication device 2 and the second interface 25 for contact-bound communication with a contact-bound communication device 3 during the operation of the second operating system 30. The interface switching means enables the second operating system 30 to access the first storage location 22 via the first operating system 22 both during communication via the first interface 10 and during communication via the second interface 25, as a result of which for example the banking company has the possibility of both contactless communication and contact-bound communication via the bank terminal. In this respect it is to be noted as well that the interface switching means may also enable contactless communication as well as contact-bound communication during operation of the first operating system.

It is to be noted that an entrance gate terminal may be formed by a turnstile or an entrance barrier equipped with a contactless communication device 2. In the case of an appropriate communication range of the contactless communication device 2 a part of the entrance gate terminal may alternatively be formed by a carpet, or a part of a floor, or a part of a wall covering or a ceiling covering, in which part the primary coil 5 of the contactless communication device 2 has been integrated. An entrance gate terminal is to be understood to mean also a mobile ticket cancellation station having a contactless communication device and carried, for example, by a conductor.

The invention claimed is:

1. A data carrier for the storage of data,
    which data carrier has a first interface for communication with a first communication device and which data carrier has a second interface for communication with a second communication device and
    which data carrier includes an electrical circuit arrangement,
    which circuit arrangement includes a first voltage supply means, a first clock generator, and a first signal conversion means of the first interface and a second voltage supply means, a second clock generator, and a second signal conversion means of the second interface and
    which circuit arrangement has memory means for the storage of data, which memory means has a first storage location, a second storage location, and a third storage location, and which circuit arrangement has a first memory access means, arranged between the first interface and the memory means, for accessing the first storage location, the third storage location, and not the second storage location of the memory means and which circuit arrangement has a second memory access means, arranged between the second interface and the memory means, for accessing the second storage location, the third storage location, and not the first storage location of the memory means and
    which circuit arrangement has access enabling means which enable the first storage location to be accessed only by the first memory access means, characterized
    in that the data carrier has additional memory access means adapted to cooperate with the second memory access means and adapted to access the first storage location and designed to verify an access authorization for the access to the first storage location, and
    in that after a positive result of the verification of the access authorization the second memory access means can, in addition, access the first storage location via the additional memory access means and via the first memory access means.

2. A data carrier as claimed in claim 1, characterized in that the additional memory access means are included in the first memory access means.

3. A data carrier as claimed in claim 1, characterized in that the additional memory access means include access code verification means for the verification of an access code, and
    in that a first access code from the second memory access means as well as a second access code can be applied to the access code verification means, which second access code can be calculated from data stored in the first storage location, and in that agreement of the first access code and the second access code is prerequisite for the positive result of the verification of the access authorization.

4. A data carrier as claimed in claim 3, characterized in that an access code calculation means has been provided for the calculation of the calculable second access code, and
    in that the access code calculation means is adapted to execute a triple DES encryption process.

5. A data carrier as claimed in claim 3, characterized
    in that the additional memory access means have, in addition to the access code verification means, access condition verification means for the verification of an access condition, and
    in that a first access condition from the second memory access means as well as a second access condition can be applied to the access condition verification means, which second access condition can be determined from data stored in the first storage location, and
    in that agreement of the first access code and the second access code as well as agreement of the first access condition and the second access condition are prerequisite for the positive result of the verification of the access authorization.

6. A data carrier as claimed in claim 1, characterized
    in that the electrical circuit arrangement of the data carrier takes the form of an integrated circuit.

7. An electrical circuit arrangement for a data carrier for the storage of data,
    which circuit arrangement includes a first voltage supply means, a first clock generator, and a first signal conversion means of the first interface for communication with a first communication device and
    which circuit arrangement includes a second voltage supply means, a second clock generator, and a second signal conversion means of a second interface for communication with a second communication device and
    which circuit arrangement has memory means for the storage of data, which memory means has a first storage location, a second storage location, and a third storage location, and which circuit arrangement has a first memory access means, arranged between the first voltage supply means, the first clock generator, and the first signal conversion means of the first interface and the memory means, for accessing the first storage location, the third storage location, and not the second storage location of the memory means and which circuit arrangement has a second memory access means, arranged between the second voltage supply means, the second clock generator, and the second signal conversion means of the second interface and the memory means, for accessing the second storage location, the third storage location, and not the first storage location of the memory means and which circuit arrangement has access enabling means which enable the first storage location to be accessed only by the first memory access means, characterized in that the circuit arrangement has additional memory access means adapted to cooperate with the second memory access means and adapted to access the first storage location and designed to verify an access authorization for the access to the first storage location, and in that after a positive result of the verification of the access authorization the second memory access means can, in addition, access the first storage location via the additional memory access means and via the first memory access means.

8. A circuit arrangement as claimed in claim 7, characterized in that the additional memory access means are included in the first memory access means.

9. A circuit arrangement as claimed in claim 7, characterized in that the additional memory access means include access code verification means for the verification of an access code, and in that a first access code from the second memory access means as well as a second access code can be applied to the access code verification means, which second access code can be calculated from data stored in the first storage location, and in that agreement of the first access code and the second access code as well as agreement of the first access condition and the second access is prerequisite for the positive result of the verification of the access authorization.

10. A circuit arrangement as claimed in claim 9, characterized in that an access code calculation means has been provided for the calculation of the calculable second access code, and in that the access code calculation means is adapted to execute a triple DES encryption process.

11. A circuit arrangement as claimed in claim 9, characterized in that the additional memory access means have, in addition to the access code verification means, access condition verification means for the verification of an access condition, and in that a first access condition from the second memory access means as well as a second access condition can be applied to the access condition verification means, which second access condition can be determined from data stored in the first storage location, and in that agreement of the first access code and the second access code as well as agreement of the first access condition and the second access condition are prerequisite for the positive result of the verification of the access authorization.

12. A circuit arrangement as claimed in claim 7, characterized in that the electrical circuit arrangement takes the form of an integrated circuit.

13. A method of accessing a memory means of a data carrier having a first storage location and a second storage location, the method comprising:

storing data in at least the first storage location of the memory means, enabling the first storage location to be accessed directly only by a first memory access means, applying access authorizations for access to the first storage location to additional memory access means, verifying the applied access authorizations with the aid of the additional memory access means, and accessing, after verification of the access authorizations and in the case of a positive result of the verification, the first storage location indirectly by a second memory access means via the additional memory access means and via the first memory access means.

14. A method as claimed in claim 13, characterized in that during the verification of the access authorizations a first access code is compared with a second access code by means of access code verification means, and in that the first access code is applied from the second memory access means, and the second access code is calculated from data stored in the first storage location, and in that agreement of the first access code and the second access code is prerequisite for the positive result of the verification.

15. A method as claimed in claim 14, characterized in that during the verification of the access authorizations, in addition to the comparison of the first access code and the second access code with the aid of the access code verification means, a first access condition is compared with a second access condition with the aid of access condition verification means, and in that the first access condition is applied from the second memory access means to the access condition verification means and the second access condition is determined from data stored in the first storage location, and in that agreement of the first access code and the second access code as well as agreement of the first access condition and the second access condition are prerequisite for the positive result of the verification.

* * * * *